(12) United States Patent
Roach et al.

(10) Patent No.: US 10,563,578 B2
(45) Date of Patent: Feb. 18, 2020

(54) ACOUSTIC LINERS AND METHOD OF SHAPING AN INLET OF AN ACOUSTIC LINER

(71) Applicants: MRA Systems, Inc., Baltimore, MD (US); GENERAL ELECTRIC COMPANY, Schenectady, NY (US)

(72) Inventors: Andrew Michael Roach, Baltimore, MD (US); Richard David Cedar, Cincinnati, OH (US); Steven Thomas Davies, Baltimore, MD (US); Timothy Richard Depuy, Cincinnati, OH (US); Graham Frank Howarth, Middletown, DE (US); Michael Moses Martinez, Cincinnati, OH (US)

(73) Assignee: MRA Systems, LLC, Baltimore, MD (US)

( * ) Notice: Subject to any disclaimer, the term of this patent is extended or adjusted under 35 U.S.C. 154(b) by 115 days.

(21) Appl. No.: 15/550,800

(22) PCT Filed: Feb. 18, 2015

(86) PCT No.: PCT/US2015/016314
§ 371 (c)(1),
(2) Date: Aug. 14, 2017

(87) PCT Pub. No.: WO2016/133501
PCT Pub. Date: Aug. 25, 2016

(65) Prior Publication Data
US 2018/0030896 A1    Feb. 1, 2018

(51) Int. Cl.
*F02C 7/045*    (2006.01)
*F02K 1/82*    (2006.01)
(Continued)

(52) U.S. Cl.
CPC ............ *F02C 7/045* (2013.01); *B32B 3/12* (2013.01); *B32B 3/266* (2013.01); *B64D 33/02* (2013.01);
(Continued)

(58) Field of Classification Search
None
See application file for complete search history.

(56) References Cited

U.S. PATENT DOCUMENTS 2,062,478 A * 12/1936 Riesz ................... G01H 3/00
                                                181/198
2,280,631 A *  4/1942 Coffey .................. A01B 15/02
                                                181/293

(Continued)

FOREIGN PATENT DOCUMENTS

CN    102883872 A    1/2013
CN    203773937 U    8/2014
(Continued)

OTHER PUBLICATIONS

Machine Translation of WO 2017090538 A1/JP 2017107160 A (Year: 2017).*

(Continued)

*Primary Examiner* — Jeffrey A Vonch
(74) *Attorney, Agent, or Firm* — McGarry Bair PC

(57) ABSTRACT

An acoustic liner for a turbine engine, the acoustic liner includes a support layer that includes a set of partitioned cavities with open faces, a perforated sheet that includes a set of perforations with corresponding inlets, the perforated sheet supported by the support layer such that perforations are in overlying relationship with the open faces to form paired perforations and cavities that define acoustic resonator cells, and a coating applied to the perforated sheet.

20 Claims, 7 Drawing Sheets

(51) Int. Cl.
*G10K 11/168* (2006.01)
*G10K 11/172* (2006.01)
*B05D 5/08* (2006.01)
*B64D 33/02* (2006.01)
*B32B 3/12* (2006.01)
*B32B 3/24* (2006.01)
*B32B 3/26* (2006.01)
*F02C 7/24* (2006.01)
*F02K 1/44* (2006.01)
*G10K 11/16* (2006.01)

(52) U.S. Cl.
CPC .......... *G10K 11/168* (2013.01); *G10K 11/172* (2013.01); *B05D 5/083* (2013.01); *B32B 2255/00* (2013.01); *B32B 2255/26* (2013.01); *B32B 2260/00* (2013.01); *B32B 2305/024* (2013.01); *B32B 2305/07* (2013.01); *B32B 2307/102* (2013.01); *B32B 2307/554* (2013.01); *B32B 2307/73* (2013.01); *B32B 2307/746* (2013.01); *B32B 2605/18* (2013.01); *B64D 2033/0206* (2013.01); *F02C 7/24* (2013.01); *F02K 1/44* (2013.01); *F02K 1/822* (2013.01); *F02K 1/827* (2013.01); *F05D 2220/323* (2013.01); *F05D 2230/90* (2013.01); *F05D 2250/191* (2013.01); *F05D 2250/283* (2013.01); *F05D 2260/963* (2013.01); *F05D 2300/603* (2013.01); *F05D 2300/611* (2013.01); *G10K 11/161* (2013.01); *Y02T 50/672* (2013.01); *Y10T 428/24149* (2015.01); *Y10T 428/24322* (2015.01); *Y10T 428/24331* (2015.01)

(56) References Cited

U.S. PATENT DOCUMENTS

| | | | | | |
|---|---|---|---|---|---|
| 3,516,895 A * | 6/1970 | Hartman | ............... | B21D 47/00 | 428/116 |
| 3,640,357 A * | 2/1972 | Kitching | ............... | F01N 1/24 | 181/292 |
| 3,734,234 A * | 5/1973 | Wirt | ............... | E04B 1/86 | 181/286 |
| 3,770,560 A * | 11/1973 | Elder | ............... | B32B 27/00 | 428/138 |
| 3,819,007 A * | 6/1974 | Wirt | ............... | E04B 1/86 | 181/286 |
| 3,821,999 A * | 7/1974 | Guess | ............... | G10K 11/172 | 181/296 |
| 4,338,360 A * | 7/1982 | Cavanagh | ............... | C23C 4/01 | 427/247 |
| 4,402,992 A * | 9/1983 | Liebert | ............... | C23C 4/134 | 427/243 |
| 4,449,607 A * | 5/1984 | Forestier | ............... | F02K 1/827 | 181/213 |
| 4,465,725 A * | 8/1984 | Riel | ............... | B29D 24/005 | 428/116 |
| 4,539,245 A * | 9/1985 | Sarin | ............... | B32B 3/12 | 428/116 |
| 4,541,879 A * | 9/1985 | Riel | ............... | G10K 11/172 | 156/182 |
| 4,655,044 A * | 4/1987 | Dierberger | ............... | F23R 3/002 | 60/753 |
| 4,743,462 A * | 5/1988 | Radzavich | ............... | C23C 4/02 | 427/282 |
| 4,850,093 A * | 7/1989 | Parente | ............... | B21D 47/00 | 29/428 |
| 5,130,163 A * | 7/1992 | Clingman | ............... | C23C 4/02 | 427/226 |
| 5,362,931 A * | 11/1994 | Fries | ............... | G10K 11/172 | 181/284 |
| 5,422,446 A * | 6/1995 | Fries | ............... | G10K 11/172 | 181/293 |
| 5,590,854 A * | 1/1997 | Shatz | ............... | B64C 1/12 | 244/130 |
| 5,702,288 A * | 12/1997 | Liebke | ............... | B24B 31/116 | 451/113 |
| 5,721,402 A * | 2/1998 | Parente | ............... | B64C 21/04 | 181/214 |
| 5,741,456 A * | 4/1998 | Ayrton | ............... | B29C 70/545 | 264/400 |
| 5,771,577 A * | 6/1998 | Gupta | ............... | F01D 5/186 | 29/889.72 |
| 5,965,044 A * | 10/1999 | Clarke | ............... | G10K 11/161 | 219/121.71 |
| 6,004,620 A * | 12/1999 | Camm | ............... | B23P 6/002 | 427/142 |
| 6,122,892 A * | 9/2000 | Gonidec | ............... | B32B 3/12 | 52/793.1 |
| 6,171,711 B1 * | 1/2001 | Draghi | ............... | C23C 4/02 | 428/596 |
| 6,202,304 B1 * | 3/2001 | Shatz | ............... | B64C 1/12 | 204/192.32 |
| 6,206,136 B1 * | 3/2001 | Swindlehurst | ............... | F02C 7/045 | 181/290 |
| 6,248,423 B1 | 6/2001 | Clarke | | | |
| 6,265,022 B1 * | 7/2001 | Fernihough | ............... | F01D 5/28 | 427/142 |
| 6,333,069 B1 * | 12/2001 | Beeck | ............... | F01D 5/186 | 427/140 |
| 6,358,590 B1 * | 3/2002 | Blair | ............... | B23K 15/085 | 428/73 |
| 6,365,013 B1 * | 4/2002 | Beele | ............... | C23C 4/12 | 118/300 |
| 6,451,241 B1 * | 9/2002 | Ohliger | ............... | B29C 70/44 | 264/156 |
| 6,598,701 B1 * | 7/2003 | Wood | ............... | G10K 11/162 | 181/284 |
| 6,720,069 B1 * | 4/2004 | Murakami | ............... | G10K 11/16 | 428/319.3 |
| 6,977,109 B1 * | 12/2005 | Wood | ............... | G10K 11/16 | 181/292 |
| 7,540,354 B2 | 6/2009 | Morin | | | |
| 2001/0001680 A1 * | 5/2001 | Farmer | ............... | C23C 4/02 | 427/348 |
| 2001/0050197 A1 * | 12/2001 | Wood | ............... | G10K 11/16 | 181/292 |
| 2002/0036115 A1 * | 3/2002 | Wilson | ............... | B32B 3/20 | 181/292 |
| 2003/0006089 A1 * | 1/2003 | Ishii | ............... | B64D 29/00 | 181/210 |
| 2003/0010035 A1 * | 1/2003 | Farmer | ............... | C23C 4/00 | 60/752 |
| 2003/0026952 A1 * | 2/2003 | Fried | ............... | C23C 4/00 | 428/169 |
| 2003/0141144 A1 * | 7/2003 | Wilson | ............... | B32B 3/20 | 181/292 |
| 2004/0060652 A1 * | 4/2004 | McNeely | ............... | B32B 37/1284 | 156/285 |
| 2004/0148891 A1 * | 8/2004 | Porte | ............... | G10K 11/168 | 52/506.01 |
| 2005/0019589 A1 * | 1/2005 | Wiedemann | ............... | B05D 5/02 | 428/450 |
| 2006/0059918 A1 * | 3/2006 | Caldwell | ............... | F23R 3/06 | 60/772 |
| 2007/0119832 A1 * | 5/2007 | Beck | ............... | B23K 26/0608 | 219/121.71 |
| 2007/0210073 A1 * | 9/2007 | Hubert | ............... | B64D 15/12 | 219/535 |
| 2007/0272483 A1 * | 11/2007 | Morin | ............... | F02C 7/045 | 181/291 |
| 2008/0248300 A1 * | 10/2008 | Bogue | ............... | B05D 3/0254 | 428/357 |
| 2009/0038883 A1 * | 2/2009 | Kim | ............... | E04B 1/86 | 181/291 |
| 2009/0045009 A1 * | 2/2009 | Chiou | ............... | G10K 11/168 | 181/290 |

(56) References Cited

U.S. PATENT DOCUMENTS

| | | | | |
|---|---|---|---|---|
| 2009/0226626 A1* | 9/2009 | Gupta | C23C 4/01 | 427/448 |
| 2009/0304979 A1* | 12/2009 | Mueller | B32B 3/12 | 428/69 |
| 2010/0126971 A1* | 5/2010 | Calder | B23K 15/0006 | 219/121.18 |
| 2012/0087802 A1* | 4/2012 | von Niessen | C23C 4/12 | 416/241 R |
| 2012/0094029 A1* | 4/2012 | Halberstadt | C23C 4/12 | 427/446 |
| 2012/0131922 A1* | 5/2012 | Raji | C23C 4/16 | 60/752 |
| 2012/0291937 A1* | 11/2012 | Drevon | B32B 3/12 | 156/60 |
| 2013/0014510 A1* | 1/2013 | Pater | F01D 5/18 | 60/752 |
| 2015/0344142 A1* | 12/2015 | Roach | B64D 33/02 | 181/292 |
| 2016/0047253 A1* | 2/2016 | Ward, Jr. | C23C 4/02 | 427/256 |
| 2016/0107746 A1* | 4/2016 | Tiwari | B64C 7/02 | 137/565.23 |
| 2016/0171960 A1* | 6/2016 | Porte | C23C 4/134 | 181/292 |
| 2016/0177733 A1* | 6/2016 | Lewis | F01D 5/186 | 416/95 |
| 2016/0237853 A1* | 8/2016 | Harris | F02K 1/822 | |
| 2016/0273391 A1* | 9/2016 | Burd | F01D 25/30 | |
| 2016/0335999 A1* | 11/2016 | Zalewski | G10K 11/172 | |
| 2017/0053635 A1* | 2/2017 | Leon | B32B 9/005 | |

FOREIGN PATENT DOCUMENTS

| | | | | |
|---|---|---|---|---|
| DE | 4316843 A1 * | 11/1994 | | B23K 15/085 |
| DE | 102004034721 A1 * | 2/2006 | | F01D 5/186 |
| EP | 509166 B1 | 1/1964 | | |
| EP | 1071072 A2 | 1/2001 | | |
| EP | 1188547 A1 * | 3/2002 | | B32B 3/12 |
| EP | 1403330 A1 | 9/2002 | | |
| EP | 2489856 A2 | 8/2012 | | |
| FR | 2962586 A1 * | 1/2012 | | G10K 11/172 |
| JP | 60123000 U * | 8/1985 | | B23K 15/085 |
| JP | 2007315386 A | 12/2007 | | |
| WO | WO-2006056351 A1 * | 6/2006 | | G10K 11/172 |
| WO | WO-2008141380 A1 * | 11/2008 | | B32B 3/266 |
| WO | 2011070279 A1 | 6/2011 | | |
| WO | WO-2017090538 A1 * | 6/2017 | | E01F 8/00 |

OTHER PUBLICATIONS

International Search Report and Written Opinion issued in connection with corresponding PCT application No. PCT/US2015/016314 dated Sep. 18, 2015.

Machine Translation and First Office Action and Search issued in connection with corresponding CN Application No. 201580076555.7 dated Oct. 31, 2018.

Machine Translation and Notification of Reasons for Refusal issued in connection with corresponding JP Application No. 2017-542830 dated Nov. 13, 2018.

* cited by examiner

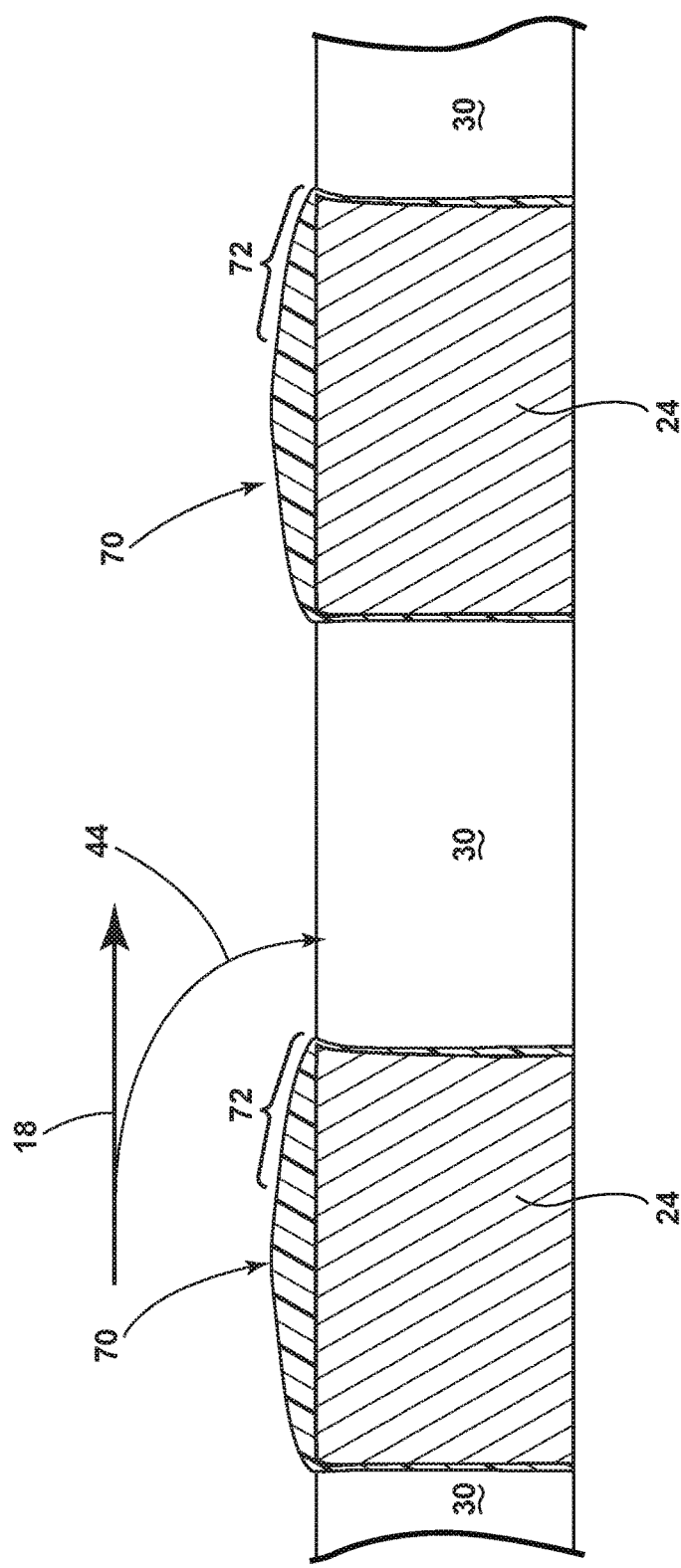

ACOUSTIC LINERS AND METHOD OF SHAPING AN INLET OF AN ACOUSTIC LINER

BACKGROUND OF THE INVENTION

Contemporary aircraft engines can include acoustic attenuation panels in aircraft engine nacelles to reduce noise emissions from aircraft engines. These acoustic attenuation panels generally have a sandwich structure comprising liners enclosing a cellular honeycomb-type inner structure.

BRIEF DESCRIPTION OF THE INVENTION

In one aspect, an embodiment of the invention relates to an acoustic liner having a support layer that includes a set of partitioned cavities with open faces, a perforated sheet that includes a set of perforations with corresponding inlets, the perforated sheet supported by the support layer such that perforations are in overlying relationship with the open faces to form paired perforations and cavities that define acoustic resonator cells, and a coating applied to the perforated sheet and having a portion, at least upstream relative to the through air flow of the inlets, with a reducing thickness to define a transition area leading up to the inlets.

In another aspect, an embodiment of the invention relates to a method of shaping an inlet of an acoustic liner, the method includes applying a coating to the perforated sheet to form a portion of the coating with a reducing cross section leading up to the inlet along an air flow direction across the acoustic liner.

BRIEF DESCRIPTION OF THE DRAWINGS

In the drawings:

FIGS. 5A-5C illustrate a coating applied to a perforated sheet according to embodiments of the invention.

DESCRIPTION OF EMBODIMENTS OF THE INVENTION

Figure 1:
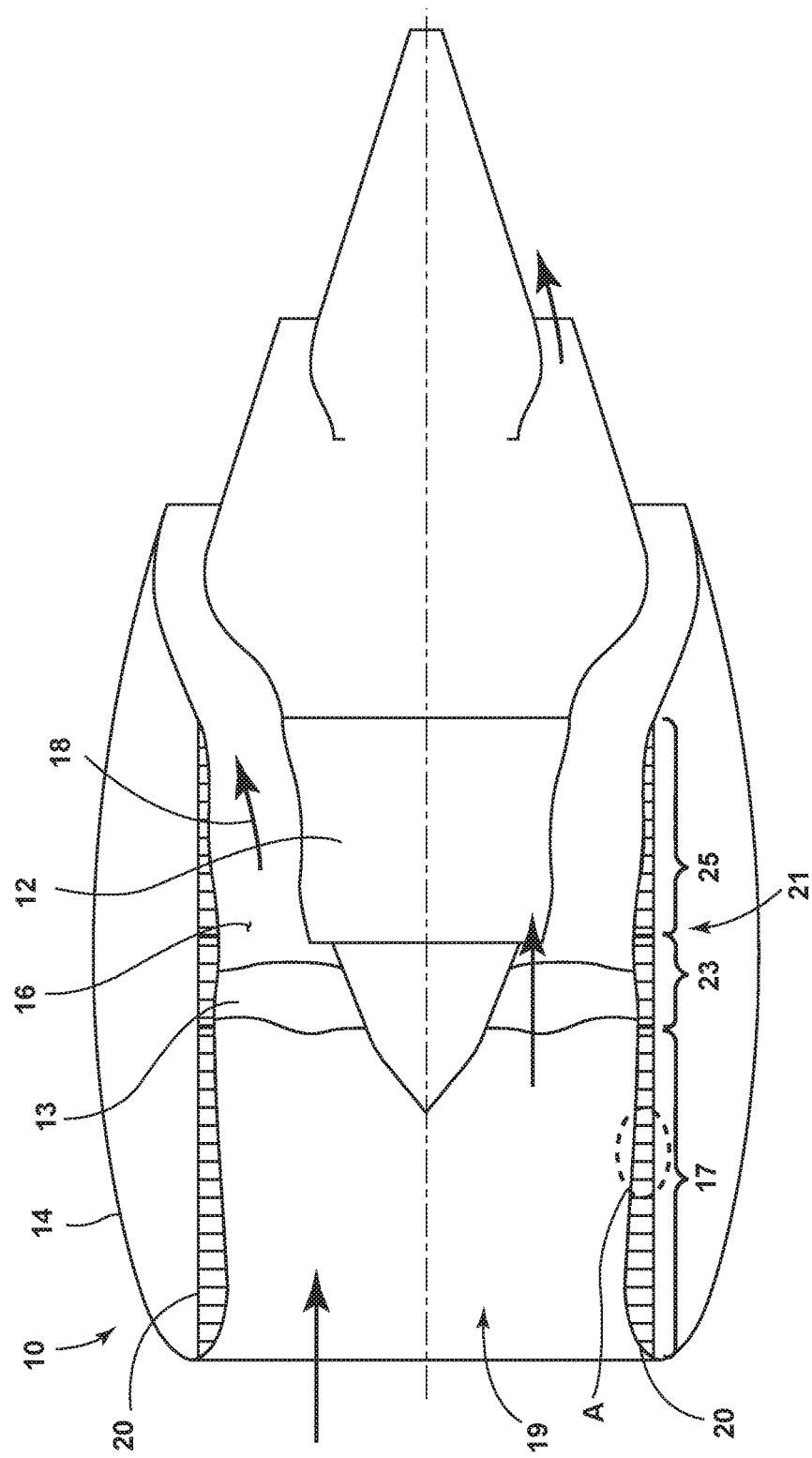
FIG. 1 is a schematic view of an aircraft engine assembly with a portion of the outer nacelle cut away for clarity.

FIG. 1 illustrates an aircraft engine assembly 10 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 10 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section can be provided within the nacelle wherein the fan section 21 is in fluid communication with the inlet 19. An annular acoustic panel 20 is provided within the nacelle in at least a portion of the inlet 19 or the fan section 21. The acoustic panel 20 forms a liner for attenuating noise in the aircraft engine assembly 10 and defines the through air flow.

Figure 2:
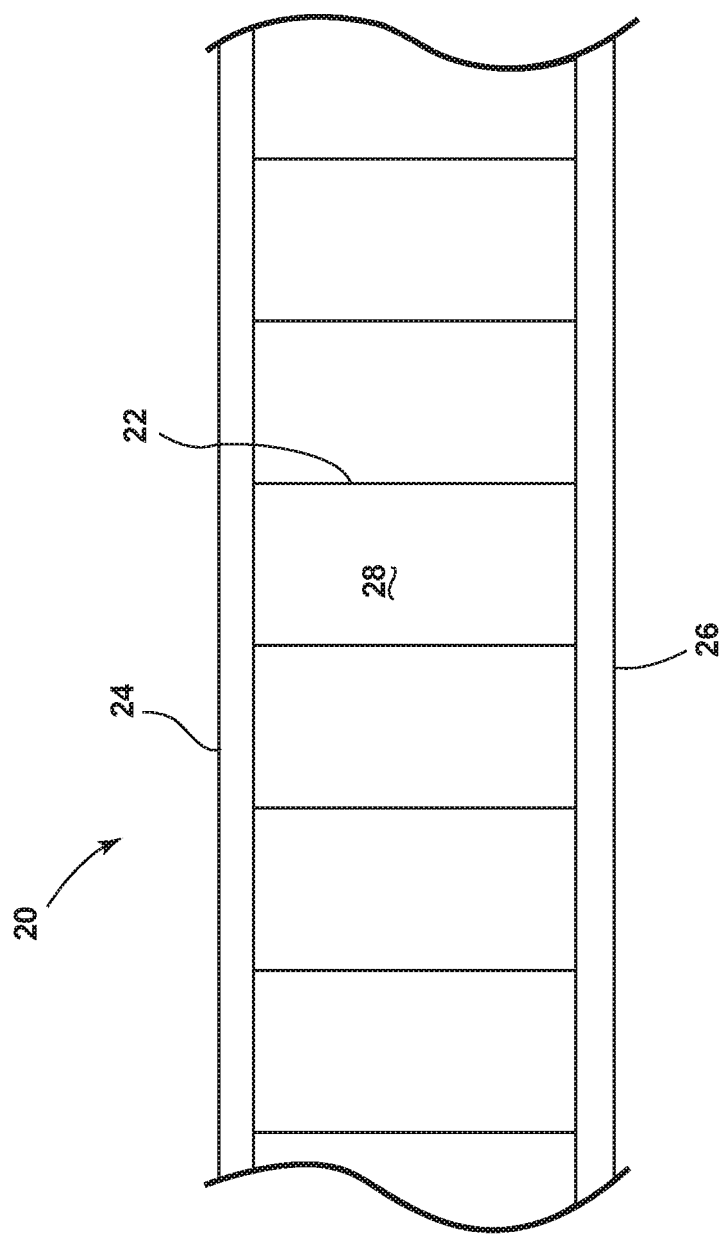
FIG. 2 is a detail view of section A of the acoustic panel of FIG. 1 illustrating a partitioned support structure with facing and backing sheets.

FIG. 2 shows a detailed view of the annular acoustic panel of FIG. 1. The annular acoustic panel 20 includes an open framework 22 disposed between an imperforate backing sheet 26 and a front perforated sheet 24. The open framework 22 forms a support layer having a set of partitioned cavities or cells 28 with open faces. Including that the open framework 22 has open faces on opposing front and rear sides of the open framework 22. In this manner, the open framework 22 forms a set of cells 28 in the open spaces between the open framework 22, the backing sheet 26, and the perforated sheet 24.

Figure 3:
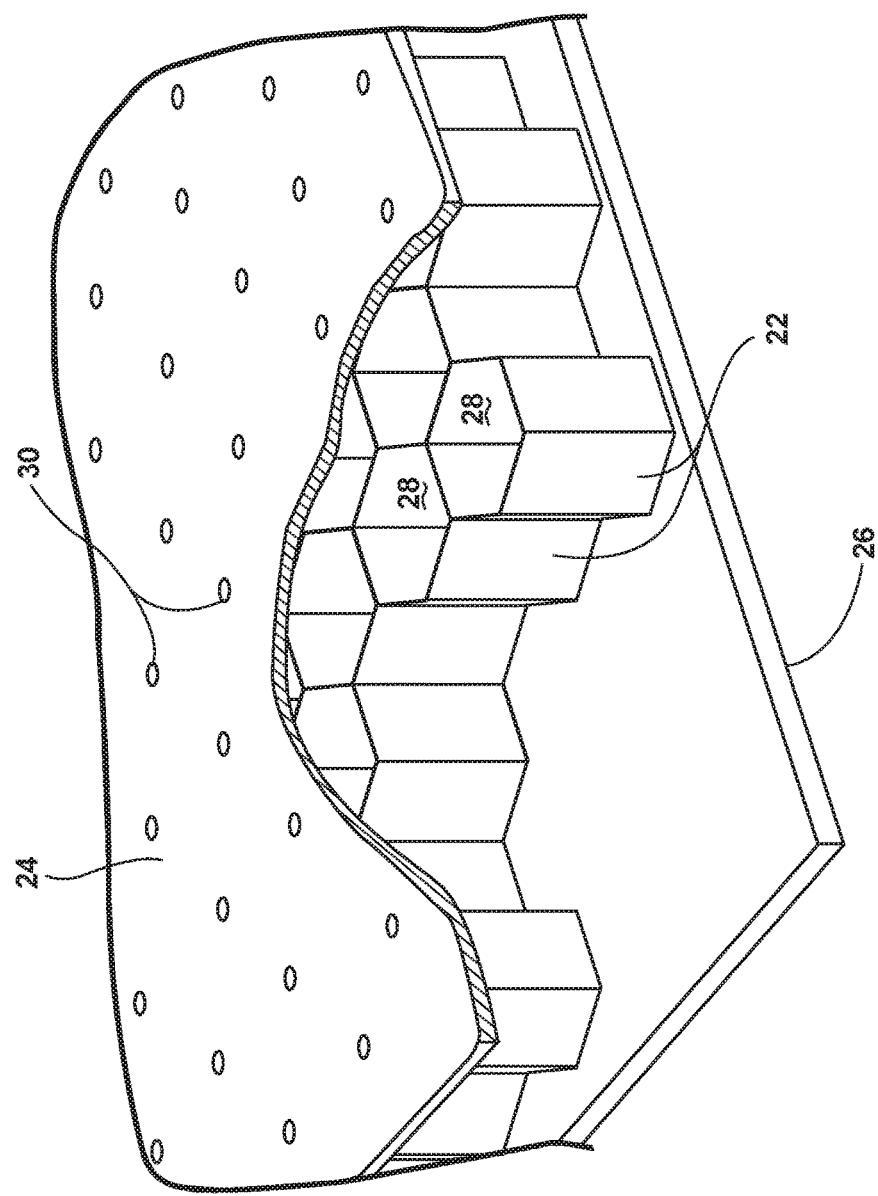
FIG. 3 is perspective view of the acoustic panel of FIG. 1 with portions of the support structure and facing sheet removed for clarity.

As illustrated more clearly in FIG. 3, the cells 28 formed by the open framework 22 disposed between the backing sheet 26 and the perforated sheet 24 each have a predetermined volume defined by the geometry of the open framework 22 and the spacing between the backing sheet 26 and the perforated sheet 24. The open framework 22 can include a honeycomb structure wherein the cells have six walls formed by the open frame work 22, a top wall formed by the backing sheet 26 and a bottom wall formed by the perforated sheet 24. The backing sheet 26 can be impervious with respect to air. More specifically, the backing sheet 26 can be an imperforate sheet supported by the support layer or open framework 22 on an opposite side of the open framework 22 than the perforated sheet 24. In this manner, the imperforate sheet is on a back side of the open framework 22 and closes off the open faces on the back side.

The perforated sheet 24 can be perforated such that a set of perforations 30, which form inlets, in a predetermined pattern are formed in the perforated sheet 24 to allow air into selected cells 28. The perforated sheet 24 can be operably coupled to the open framework 22 such that perforations 30 are in overlying relationship with the open faces of the open framework 22 to form paired perforations 30 and cavities that define the acoustic resonator cells 28. The perforated sheet can be directly supported on the open framework 22. Alternatively, an intervening layer can be utilized. The perforated sheet 24 can be formed from any suitable material including, but not limited to, a composite material. The perforations can be sized in order to attenuate various frequencies. For instance, the perforations can be between 0.005 and 0.010 inches in diameter. The backing sheet 26 and perforated sheet 24 and open framework 22 can be formed such that there are no seams present in backing sheet 26 and perforated sheet 24 and open framework 22.

Cells 28 can form a portion of an acoustic resonator. For instance, the area of the perforation 30 and thickness of the perforated sheet 24 can define neck portions of Helmholtz resonators, and the volume of the cells 28 can define the cavity volume. In addition, the acoustic resonators can be tuned to attenuate engine sounds. For example, the resonators can be tuned to attenuate predetermined frequencies associated with engine sounds entering the acoustic resonators. The honeycomb cells 28 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

Figure 4:
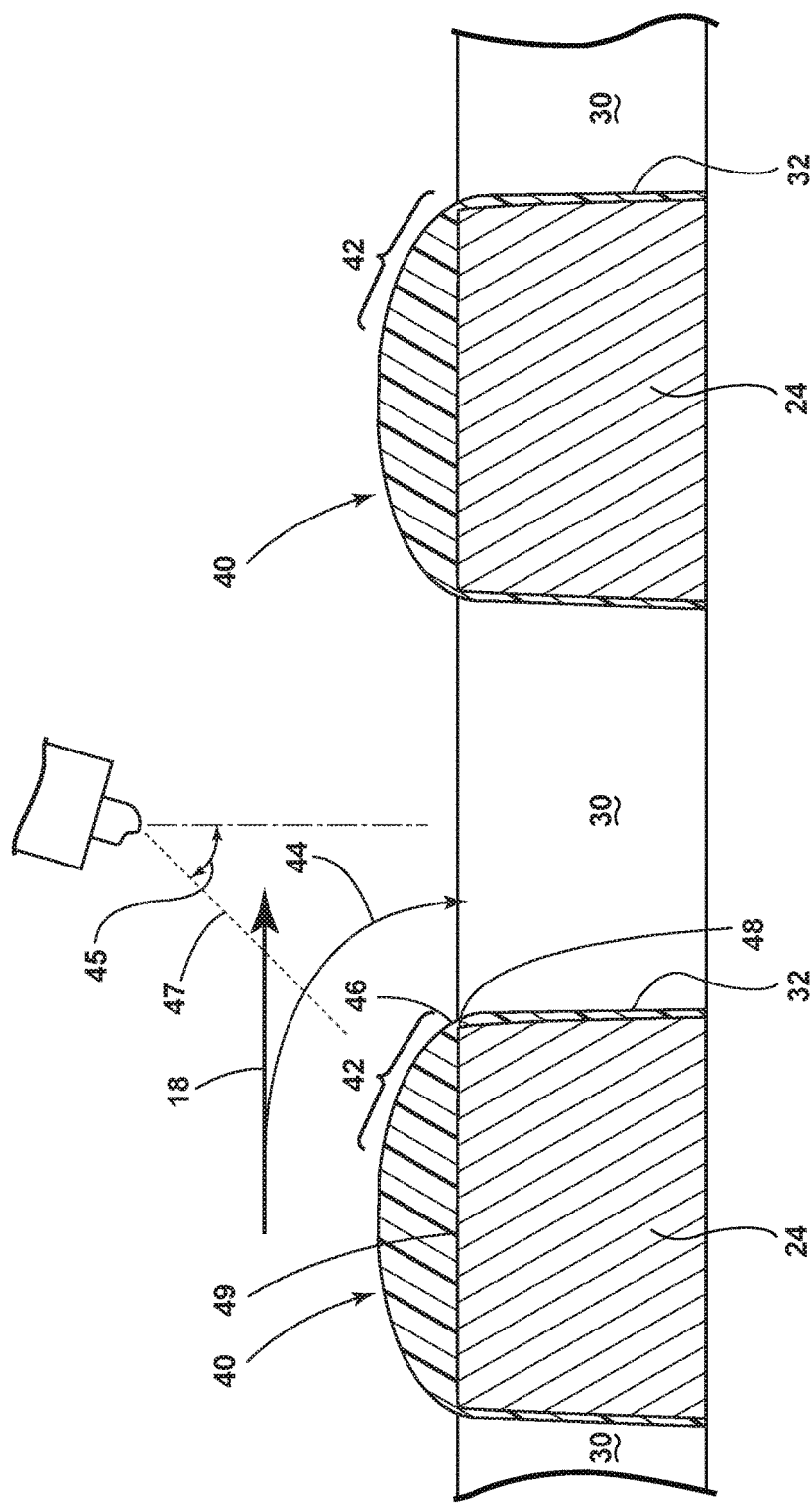
FIG. 4 is a sectional view showing a coating applied to the perforated sheet of FIG. 3 according to an embodiment of the invention.

FIG. 4 illustrates a coating 40 applied to the perforated sheet 24 and having a portion with a reducing thickness 42 leading up to a perforation 30, to define a transition area leading up to the perforation 30 according to an embodiment of the invention. In this manner, the portion with a reducing thickness 42 can be upstream relative to the through air flow 44 of the perforations 30 or can be constant around the circumference of the perforation. The portion with the reducing thickness 42 can have any suitable shape, profile or contour including, but not limited to, that the portion with the reducing thickness 42 can have a radius, a continuously reducing thickness, a linear step-wise reducing thickness, etc. In this manner, it will be understood that the coating 40 having the reducing thickness 42 leading up to the perforations 30 can be shaped in any suitable manner so as to modify the geometry into the perforation 30 to improve the flow of acoustic energy into the resonator cells 28. For example, as shown in FIG. 4, the portion with the reducing thickness 42 can form a radius 46 when viewed in cross section. In the illustrated example, the perforations 30 have an approximately 90 degree transition angle 48 at the perforation 30 relative to an upper surface 49 of the perforated sheet 24 and the portion with the reducing thickness 42 increases the transition angle to greater than 90 degrees. The increased transition angle results in improved flow of acoustic energy into the resonator cells 28

The coating 40 can be formed from any suitable material including, but not limited to, that the coating 40 can include at least one of fluoropolymers, polymers, hydrophobic, icephobic, low friction, or anti-erosion coating. Other commercially available coating materials are also possible. By way of non-limiting example a siloxane-based nano-composite sprayable coating, which was thinned up to 10% using Naptha or Xylene can be utilized. Further still, the coating 40 can be applied in any suitable manner including, but not limited to, that the coating 40 can be a sprayed coating 40 or a vapor deposited coating 40. It will be understood that the perforation 30 can be shaped by applying a coating 40 to the perforated sheet to form a portion of the coating 40 with a reducing cross section leading up to the inlet along an air flow direction across the acoustic liner and that this can be done in any suitable manner. For example, the coating 40 can be sprayed in a direction relative to the perforated sheet 24 to form an acute angle 45 relative to the perforated sheet 24. For example, the acute angle can be 45 degrees or less. In the illustrated example, spray 47 is illustrated as being sprayed at an acute angle of 45 degrees. The coating 40 can be applied with a spraying process using conventional spray equipment. The thickness of the coating 40 can depend on the particular application and the type of coating material used, but generally, thicknesses ranging between approximately 0.001 inch to 0.030 inch will be used. The thinnest coating that achieves the desired entry geometry can be utilized to minimize weight/cost. Any suitable spray techniques utilizing different spray parameters, numbers of coats, and angles of application can be used. To achieve the desired spray characteristics and resultant geometry the coatings can be thinned and/or cured at elevated temperatures. In addition to improving acoustic performance the coating 40 can serve multiple purposes including improved corrosion, erosion, impact or wear resistance and exhibit anti-ice or reduced friction characteristics. Sidewall(s) 32 of the perforation 30 can have some coating 40 applied to them and the coating 40 on the sidewalls 32 of the perforations 30 can reduce the cross-sectional area of the perforations 30. The perforations 30 can be intentionally oversized to allow for a reduction in diameter due to spray build up.

Figure 5A:
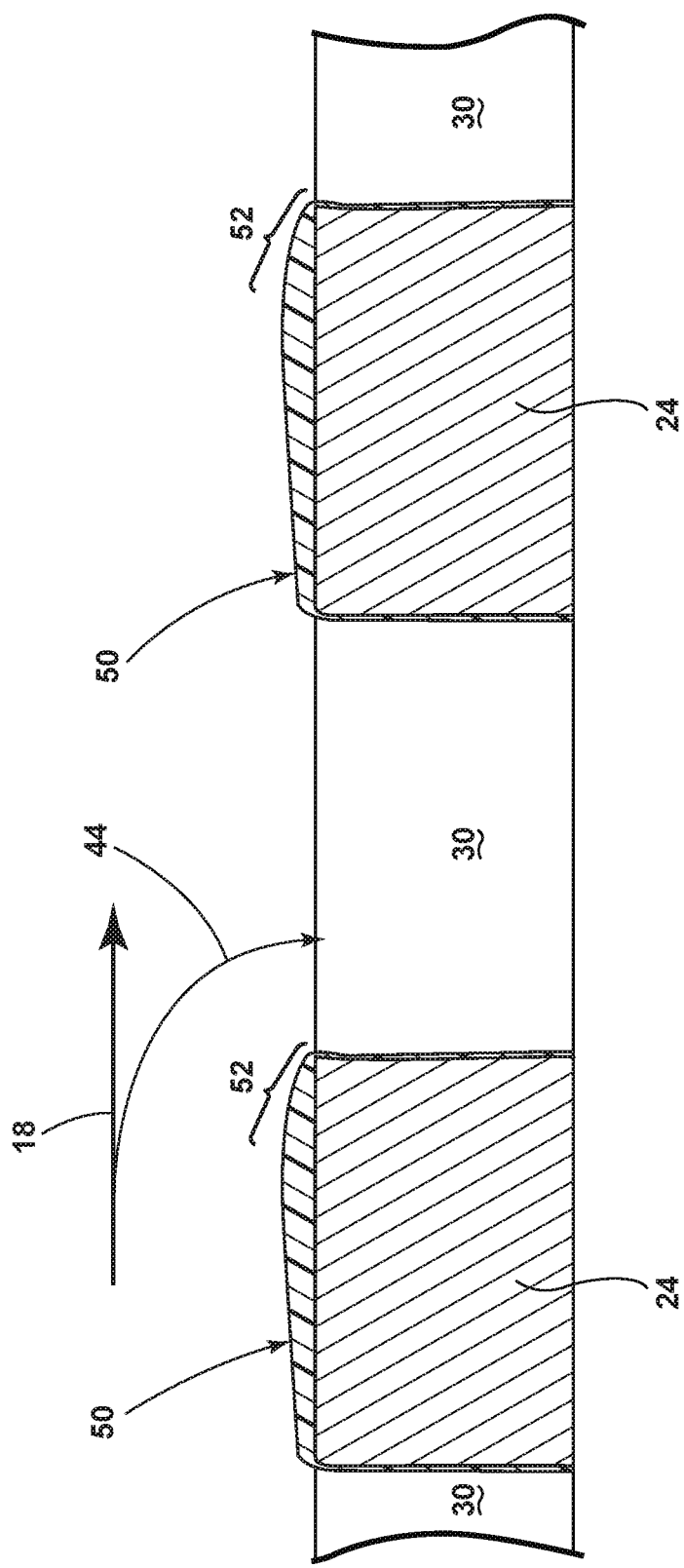
Figure 5B:
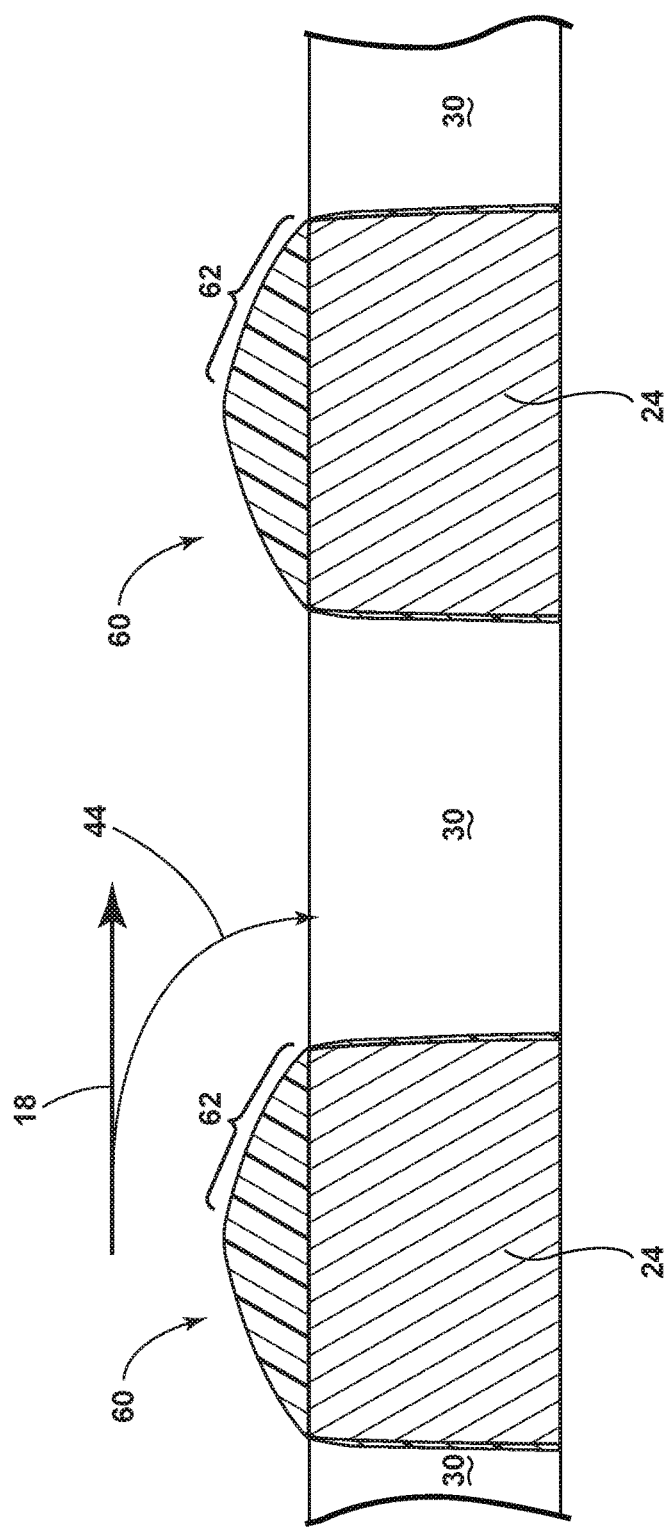

It will be understood that the coating can be used, applied or otherwise fashioned to create, form, or otherwise generate virtually any variety of shapes beneficial to improved flow into the perforation 30. By way of non-limiting examples, FIGS. 5A-FIG. 5C illustrate coatings 50, 60, 70, having portions with reducing thickness 52, 62, 72, which have been applied to achieve a number of different geometries leading into the perforation 30. It will be understood that the application of a coating can form a number of geometries including a variety of radii, as well as tapers, and chamfers.

It will be understood that the above mentioned surface treatments, modifications and applications according to the various embodiments can be applied only to a portion of the perforated sheet 24 or to the entire perforated sheet 24. It will further be understood that the above mentioned surface treatments, modifications and applications according to the various embodiments can be applied at any stage of the annular acoustic panel manufacturing process. Further, it will be understood that coating the perforated sheet 24 is generally independent of the configuration of the perforated sheet 24 or the process by which the perforated sheet 24 is manufactured. The coating can be applied to composite perforated sheet 24 in which the perforations were molded during the curing process or were created after curing by drilling or punching.

The embodiments described above provide for a variety of benefits including that the aircraft engine assembly that includes the acoustic liner can provide improved acoustic performance. The above-described embodiments utilize a coating to modify the geometry of the perforation in the acoustic liner, which can improve the flow of acoustic energy into and out of the resonator cells of the acoustic panel. The geometries achieved by the coatings cannot be achieved by the current industrial perforated hole manufacturing techniques such as drilling, punching, grit blasting or laser generation. Further, the above-described embodiments can be formed by a relatively inexpensive, conventional manufacturing technique of spray coating, which can be automated. Another benefit can be the reduction of skin perforation size and the associated reduced skin friction and drag penalty while maintaining acoustic performance associated with larger uncoated acoustic panels and perforations. The above-described embodiments provide the benefits of increased flow, reduced flow velocity, and potentially reduced discharge turbulence.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An acoustic liner for a turbine engine, comprising:
  a support layer that includes a set of partitioned cavities with open faces;
  a perforated sheet that includes a set of perforations with corresponding inlets, the perforated sheet operably coupled to the support layer and where the set of perforations are in overlying relationship with the open faces to form a set of paired perforations and cavities, with one perforation and one cavity defining an acoustic resonator cell; and a coating applied to the perforated sheet and having a portion upstream of a sidewall defining an inlet of at least one of the set of perforations relative to the a through air flow, the coating defining a through air flow passage within the turbine engine and the portion having reducing thickness defining a transition area into the inlet and adapted to modify the geometry of the air flow leading into the perforation of the acoustic resonator cell and wherein a cross-sectional area of the inlet is constant over a thickness of the perforated sheet.

2. The acoustic liner of claim 1 wherein the reducing thickness includes a continuously reducing thickness.

3. The acoustic liner of claim 1 wherein the reducing thickness includes a linear step-wise reducing thickness forming a slope into the inlet.

4. The acoustic liner of claim 1 wherein the portion with the reducing thickness forms a radius upstream of the inlet, a taper upstream of the inlet, or a chamfer upstream of the inlet.

5. The acoustic liner of claim 1 wherein the set of perforations are between 0.005 and 0.010 inches in diameter.

6. The acoustic liner of claim 1 wherein the coating has a thickness ranging between 0.001 inch and 0.030 inch and the perforation is between 0.005 inch and 0.010 inch in diameter.

7. The acoustic liner of claim 5 wherein the set of perforations have an approximately 90 degree transition angle at the inlets relative to an upper surface of the perforated sheet and the portion with the reducing thickness increases the transition angle to greater than 90 degrees.

8. The acoustic liner of claim 1 wherein the perforated sheet is directly supported on the support layer.

9. The acoustic liner of claim 1 wherein the perforated sheet includes a composite material.

10. The acoustic liner of claim 1 wherein the coating includes at least one of a fluoropolymers, polymers, hydrophobic, icephobic, low friction, or anti-erosion coating.

11. The acoustic liner of claim 10 wherein the coating is at least one of a sprayed coating or a vapor deposited coating.

12. The acoustic liner of claim 1 further includes an imperforate sheet supported by the support layer on an opposite side of the support layer than the perforated sheet.

13. A method of shaping an inlet of the acoustic liner of claim 1, the method comprising:

providing a support layer having a set of partitioned cavities with open faces;

providing a perforated sheet having a set of perforations corresponding to cavities in the set of partitioned cavities; and applying a coating to the perforated sheet and forming a portion of the coating with a reducing cross section leading up to the perforation along an air flow direction across the acoustic liner to define a transition area leading up to the perforation.

14. The method of claim 13 wherein the coating is sprayed in a direction relative to the perforated sheet to form an acute angle relative to the perforated sheet.

15. The method of claim 14 wherein a spray axis of the spray is oriented such that a projection of the spray axis onto the perforated sheet is parallel to the air flow direction.

16. The method of claim 15 wherein the acute angle is 45 degrees or less.

17. An acoustic liner for a turbine engine, comprising:

a support layer that includes a set of partitioned cavities with open faces on opposing front and rear sides of the support layer;

an imperforate sheet on the rear side of the support layer closing off the open faces on the backside;

a perforated sheet on the front side of the support layer, the perforated sheet including composite material and perforations with corresponding inlets in overlying relationship with the open faces on the front side of the support layer to form a plurality of paired perforations and cavities, with one perforation and one cavity defining an acoustic resonator cell; and a coating applied to the perforated sheet and having a portion, at least upstream relative to the through air flow of the inlets, with a reducing thickness to define a transition area leading up to the inlets wherein the perforations have an approximately 90 degree transition angle at the inlets relative to an upper surface of the perforated sheet and the portion with the reducing thickness increases the transition angle to greater than 90 degrees and is adapted to modify the geometry of the air flow into the perforation to improve the flow of acoustic energy into the acoustic resonator cells.

18. The acoustic liner of claim 17 wherein the coating is further located on the sidewall of the perforation.

19. The acoustic liner of claim 17 wherein the reducing thickness includes a continuously reducing thickness adapted to form a downward slope into the inlet.

20. The acoustic liner of claim 17 wherein the portion with the reducing thickness forms one of a radius, taper, and chamfer.

* * * * *